(12) United States Patent
Lindström et al.

(10) Patent No.: US 8,429,399 B2
(45) Date of Patent: Apr. 23, 2013

(54) METHOD AND ARRANGEMENT FOR SECURITY ACTIVATION DETECTION IN A TELECOMMUNICATION SYSTEM

(75) Inventors: Magnus Lindström, Spånga (SE); Karl Norrman, Stockholm (SE); Ghyslain Pelletier, Boden (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 253 days.

(21) Appl. No.: 12/681,212

(22) PCT Filed: Jul. 30, 2008

(86) PCT No.: PCT/EP2008/059993
§ 371 (c)(1),
(2), (4) Date: Apr. 1, 2010

(87) PCT Pub. No.: WO2009/043622
PCT Pub. Date: Apr. 9, 2009

(65) Prior Publication Data
US 2010/0263040 A1    Oct. 14, 2010

Related U.S. Application Data

(60) Provisional application No. 60/976,877, filed on Oct. 2, 2007.

(51) Int. Cl.
*H04L 9/00* (2006.01)
(52) U.S. Cl.
USPC .......................................... 713/160; 455/411
(58) Field of Classification Search .................. 713/160
See application file for complete search history.

(56) References Cited

U.S. PATENT DOCUMENTS

| | | | |
|---|---|---|---|
| 4,555,805 A * | 11/1985 | Talbot | 380/33 |
| 2003/0152232 A1* | 8/2003 | Pirila et al. | 380/270 |
| 2003/0236085 A1* | 12/2003 | Ho | 455/411 |
| 2004/0032858 A1* | 2/2004 | Kuo | 370/352 |
| 2009/0025060 A1* | 1/2009 | Mukherjee et al. | 726/3 |
| 2009/0088134 A1* | 4/2009 | Ishii et al. | 455/411 |

FOREIGN PATENT DOCUMENTS

| | | | |
|---|---|---|---|
| WO | 01/24562 A1 | 4/2001 | |
| WO | 01/43476 A1 | 6/2001 | |
| WO | 0143476 | * | 6/2001 |

OTHER PUBLICATIONS

3rd Generation Partnership Project. "RB Handling during Security Configuration." TSG-RAN WG2 Meeting #59, R2-073466, Athens, Greece, Aug. 20-24, 2007.
3rd Generation Partnership Project. 3GPP TS 33.102, V7.1.0 (Dec. 2006). 3rd Generation Partnership Project; Technical Specification Group Services and System Aspects; 3G Security; Security architecture (Release 7), Dec. 2006.

(Continued)

*Primary Examiner* — Matthew Smithers
(74) *Attorney, Agent, or Firm* — Coats & Bennett, P.L.L.C.

(57) ABSTRACT

A method and apparatus is provided for detecting the start of a secure mode by a user terminal (12) without explicit signaling. After the network (30) commands the user terminal to switch to secure mode and receives a data packet from the user terminal, the receiving network node (22) determines the security mode of the user terminal by determining whether valid security has been applied to the received data packet by the user terminal.

28 Claims, 8 Drawing Sheets

OTHER PUBLICATIONS

3rd Generation Partnership Project. "RB handling during security configuration." 3GPP TSG-RAN WG2 Meeting #59, R2-073466, Athens, Greece, Aug. 20-24, 2007.

3rd Generation Partnership Project. "RLC header design." 3GPP TSG-RAN-WG2 #58bis, Tdoc R2-072592, Orlando, USA, Jun. 25-29, 2007.

3rd Generation Partnership Project. "Combined Radio Connection Change and Security." 3GPP TSG-RAN WG 2 meeting #59, R2-073242, Athens, Greece, Aug. 20-24, 2007.

3rd Generation Partnership Project. "3rd Generation Partnership Project, Technical Specification Group Radio Access Network; Evolved Universal Terrestrial Radio Access (E-UTRA) and Evolved Universal Terrestrial Radio Access Network (E-UTRAN); Radio Interface Protocol Aspects (Release 7)." 3GPP TR 25.813, V7.1.0, Sep. 2006, Sophia Antipolis Valbonne, France.

3rd Generation Partnership Project. "Support for RoHC in LTE." 3GPP TSG-RAN WG2 Meeting #58bis, R2-072561, Orlando, USA, Jun. 24-29, 2007.

Jonsson, L-E. et al. "The RObust Header Compression (ROHC) Framework." IETF RFC 4995, Standards Track, Jul. 2007, pp. 1-38.

Pelletier, G. et al. "RObust Header Compression (ROHC): A Profile for TCP/IP (ROHC-TCP)." IETF RFC 4996, Standards Track, Jul. 2007, pp. 1-88.

Bormann, C. editor. "RObust Header Compression (ROHC): Framework and four profiles: RTP, UDP, ESP, and uncompressed." IETF RFC 3095, Standards Track, Jul. 2001, pp. 1-157.

Jonsson, L-E. et al. "RObust Header Compression (ROHC): A Compression Profile for IP." IETF RFC 3843, Standards Track, Jun. 2004, pp. 1-15.

Pelletier, G. "RObust Header Compression (ROHC): Profiles for User Datagram Protocol (UDP) Lite." IETF RFC 4019, Standards Track, Apr. 2005, pp. 1-22.

Jonsson, L-E. et al. "RObust Header Compression (ROHC): Corrections and Clarifications to RFC 3095." IETF RFC 4815, Standards Track, Feb. 2007, pp. 1-31.

Pelletier, G. et al. "RObust Header Compression Version 2 (ROHCv2): Profiles for RTP, UDP, IP, ESP and UDP Lite draft-ietf-rohc-rfc3095bis-rohcv2-profiles-02." IETF draft, Standards Track, Oct. 2, 2007, pp. 1-113.

Pelletier, G. et al. "RObust Header Compression (ROHC): ROHC over Channels That Can Reorder Packets." IETF RFC 4224, Jan. 2006, pp. 1-20.

3rd Generation Partnership Project. "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)." 3GPP TS 36.300 V8.1.0, Jun. 2007, Sophia Antipolis Valbonne, France.

3rd Generation Partnership Project; Technical Specification for the Radio Resource Control protocol for the UE-UTRAN radio interface; 3GPP TS 25.331 V7.5.0 (Jun. 2007); pp. 111-123, 511, 512, 574, 575; Release 7. http://www.3gpp.org/ftp/specs/archive/25 series/25.331/25331-750.zip.

* cited by examiner

METHOD AND ARRANGEMENT FOR SECURITY ACTIVATION DETECTION IN A TELECOMMUNICATION SYSTEM

TECHNICAL FIELD

The present invention generally relates to security mode procedures for mobile communications and, more particularly, to a procedure to detect the security mode of a user terminal.

BACKGROUND

In a mobile communication network, a user terminal may operate in secure mode or insecure mode. In secure mode, the user terminal applies security to the transmitted packets by ciphering or encrypting data packets transmitted to the network on the uplink traffic channels and control channels. On signaling channels, the user terminal also adds integrity protection to the transmitted data packets. In insecure mode, ciphering and integrity protection are turned off. The user terminal begins operation in secure mode when a network node (e.g., base station or MME) sends a secure mode command (SMC) to the user terminal.

Currently, the base station has no way of detecting when the user terminal begins secure transmission. Before the secure mode is started, the user terminal transmits unprotected data packets on the uplink. After the base station has transmitted the SMC, a user terminal may transmit one or more unprotected packets in the uplink before it has received the SMC or before the secure mode is activated by the user terminal. The base station has no way of distinguishing protected from unprotected data packets after the SMC has been transmitted to the user terminal.

The problem in detecting the start of secure mode by a user terminal may be solved by suspending all traffic from the user terminal before sending the SMC (see 3GPP RAN2 contribution R2-073466, Section 2.2, option 1), such that there is no unciphered and unprotected signaling on the uplink between the time the SMC is sent on the downlink and the time that the secure mode has been activated on the uplink. In this case, the first uplink signaling packet after the SMC is transmitted may be expected to be ciphered and integrity protected. The drawback with this approach, however, is that uplink transmissions have to be suspended for a while and, hence, some signaling may need to be postponed/delayed.

An alternative solution (see 3GPP RAN2 contribution R2-073466, Section 2.2, option 2) would be to include a flag in the packet header for all packets transmitted on the uplink to indicate whether secure the mode has been started at the user terminal. With this flag, the network may detect whether security has been started and process the packets accordingly; i.e., pass on unciphered data and decipher and/or integrity check data before passing it on, respectively. The drawback with this approach is that the flag, which is only needed at activation of security, introduces extra overhead, not only for the first few packets, but also for all packets sent after security has been activated.

A similar problem may occur when a user terminal changes security state after security has been started. For example, the user terminal may turn off the secure mode, or the security state may become invalid due to an impairment event. In the former case, the receiver would be unable to distinguish protected from unprotected data packets, while in the latter case the receiver would be unable to detect the security failure. In the case where header compression is used, the receiver would be unable to distinguish a security failure from a failure to decompress IP headers.

In the case where the secure mode is turned off, the problem may also be solved by suspending all traffic from the user terminal or by using a flag in the packet header. These solutions have the same drawbacks mentioned above. In the case where security fails, it is possible to detect the security failure by detecting whether the IP header is garbage or whether it represents a semantically correct IP header. However, when header compression is used, it is not possible for the receiver to distinguish between a failure to decompress the header and a security failure. There is too little data received and no part of the compressed information may be assumed to be static to allow this detection (redundancy between consecutive IP headers is removed). Therefore, there is no test for the case where header compression is used to distinguish between decompression failure and a security failure.

SUMMARY

The present invention provides methods and apparatus for determining the start of a secure mode by a user terminal after a Secure Mode Command (SMC) has been transmitted to the user terminal. In a secure mode, the user terminal applies security in the form of integrity protection and/or encryption to the packets transmitted to the network on the uplink traffic and control channels. The base station or other network node may blindly detect the start of the secure mode by the user terminal by determining whether a received packet has valid security (e.g., integrity protection and/or encryption) and determine appropriate processing based on such blind detection.

In a first exemplary embodiment, a network node detects that the user terminal has started to use security based on valid integrity protection being applied to the transmitted data packet. If the network is able to verify the integrity protection of an uplink data packet sent from the user terminal, it may assume that the user terminal has started to use security. If the network node cannot verify that the data packet has a valid integrity protection applied, the network node may assume that the user terminal is not using security. In the case of an unprotected uplink transmission, the network node may assume that some data of the packet (which is not an integrity protection tag) is the integrity protection tag. Because it is unlikely that arbitrary data would verify as an integrity protection tag for a certain packet, this embodiment may be considered a reliable enough indication that the user terminal has not started using security. This procedure may be made arbitrarily reliable by choosing an appropriate length of the integrity protection tag.

In a second exemplary embodiment, a network node detects that the user terminal has changed the security state (e.g., the use of protection) based on whether the uplink packets have valid integrity protection applied. In this case, the lack of valid integrity protection is taken as an indication that security was turned off by the user terminal. In this case, the attempt to verify integrity protection will be performed using non-existent or wrong integrity protection data, and will therefore, likely fail with a high probability (e.g., the information assumed to be the correct integrity protection data will in fact match another security configuration or be another type of data).

In a third exemplary embodiment, a network node determines whether the user terminal has started to use security on the uplink based on the outcome of a header decompression process or a checksum which is performed after security is removed. The decompressor's initiation of error recovery mechanisms and/or assumption of static-context damage are used to indicate that security is not being used by the user terminal on the uplink. The detection may be improved using sequence numbering attached to the data packets. The detection may be assumed immediately based on initial repeated failures or based on a number of unsuccessful recovery attempts by the compression algorithm.

In a fourth exemplary embodiment, the network node detects a security failure based on the outcome of a header decompression process or a checksum which is performed after security is removed. The decompressor's initiation of error recovery mechanisms and/or assumption of static-context damage is used to indicate that security failure has occurred. The detection may be improved using sequence numbering attached to the data packets. The detection may be assumed immediately based on initial repeated failures or based on a number of unsuccessful recovery attempts by the compression algorithm.

Of course, the present invention is not limited to the above features and advantages. Indeed, those skilled in the art will recognize additional features and advantages upon reading the following detailed description.

DETAILED DESCRIPTION

Figure 1:
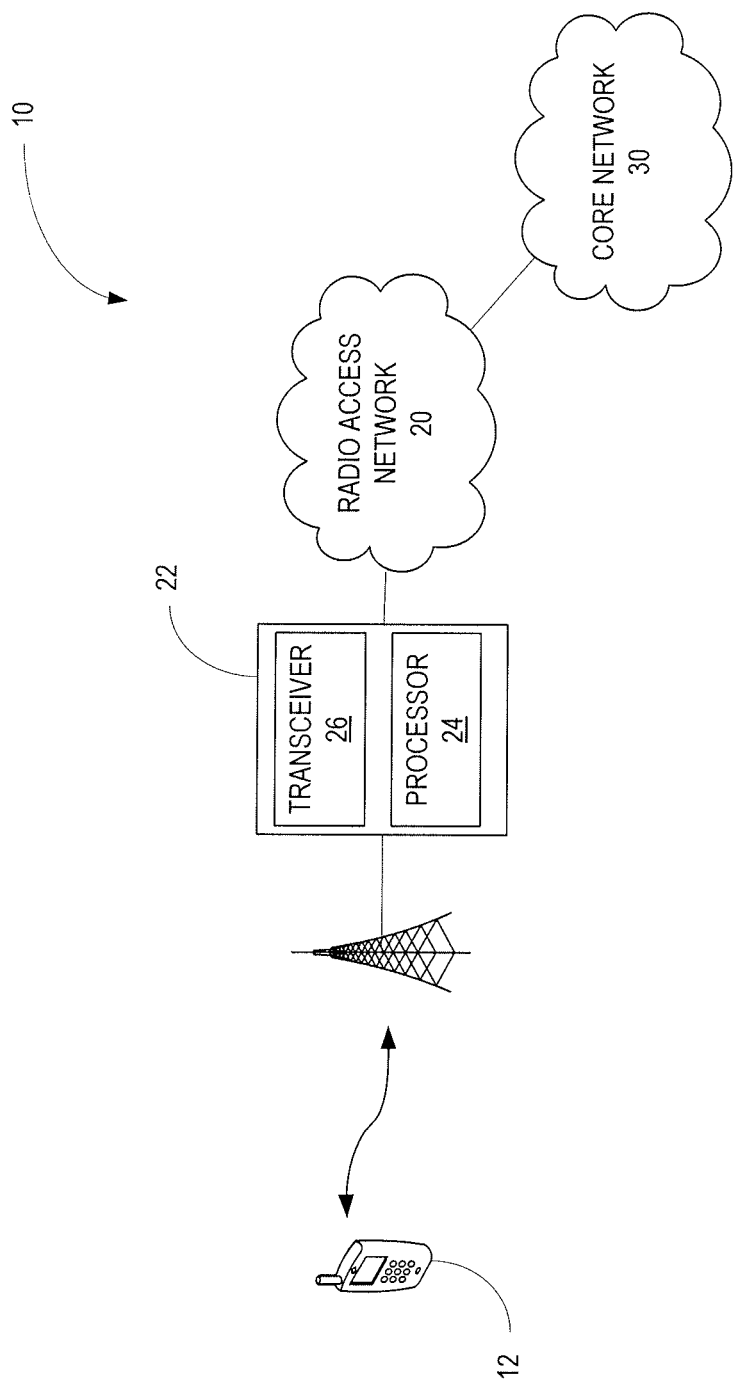
FIG. 1 illustrates an exemplary communication system.

Communication system 10 comprises a plurality of user terminals 12, a radio access network 20 having one or more base stations 22, and a core network 30. User terminal 12 may, for example, comprise a cellular telephone, personal digital assistant (PDA), laptop computer, or other wireless communication device. The user terminal 12 communicates over the air interface with a base station 22 in the RAN 20. The base station 22 includes a transceiver 26 for transmitting data to and receiving data from the user terminal 12, and a processor 24 for 20 processing data transmitted and received by the base station 22. The core network 30 connects the RAN 20 with external packet data networks (not shown) such as the Internet. The base station 22 transmits data received from the core network 30 to the user terminal 12 over the radio communication channel and forwards data received from the user terminal 12 over the radio communication channel to the core network 30. The communication network 10 may implement any known communication standard, e.g., the Universal Mobile Telecommunication System (UMTS) standard.

Communication network 10 implements several network access security measures to provide user terminals 12 with secure access to the services of the network. These security measures include integrity protection and ciphering. Integrity protection is a mandatory security feature in UMTS networks that prevents a rogue network from sending unnecessary signaling messages with the intention of causing an undesired effect in an ongoing call. In UMTS networks, integrity protection is mandatory. Ciphering is an optional security feature in UMTS networks to prevent eavesdropping by a third party by ensuring that all signaling and data messages transmitted over the air interface are encrypted or ciphered. Integrity protection is typically performed on messages transmitted over signaling bearers while ciphering is done for both signaling and data bearers.

In UMTS systems, a secure mode (integrity protection and ciphering enabled) is initiated when the core network sends a Secure Mode Command (SMC) to the user terminal. When the user terminal 12 establishes a radio resource control (RRC) connection with the core network 30, the user terminal 12 transfers the user terminal capability to the core network 30. This information informs the core network 30 what security algorithms the user terminal 12 supports. During this exchange, the secure mode is not enabled. When the core network 30 receives a bearer establishment request from the user terminal 12, the core network 30 and user terminal 12 perform an Authentication and Key Agreement (AKA) procedure to negotiate the security algorithms and security parameter values (e.g., security keys) that will be used. Following the AKA procedure, the core network 30 sends the SMC to the user terminal 12 to initiate the secure mode. The user terminal 12 responds by initializing its encryption and integrity protection algorithms using the negotiated security parameter values, sometimes referred to as a security context, and then acknowledges the SMC by sending a security mode response to the core network 30.

Before the secure mode is started, the user terminal 12 transmits unprotected data packets on the uplink. As used herein, "data packets" refers to signaling and/or traffic packets. When a user terminal 12 activates security on the uplink, the user terminal 12 applies ciphering and integrity protection to the transmitted packets. Because there may be some delay between the time that the SMC is sent by the core network 30 and the time that the user terminal 12 starts the secure mode, the base station 22 needs some mechanism to distinguish protected from unprotected data packets after the SMC has been sent to the user terminal 12. In the embodiments described below, base station 22 includes a security processor 24 to detect the security state of the user terminal 12.

Security in the forms of integrity protection and ciphering may be applied in either of the following orders:

Integrity protection first, followed by ciphering
Ciphering first, followed by integrity protection In either case, base station 22 may use the presence (or absence) of integrity protection to detect whether the user terminal 12 has started security following the transmission of the SMC.

Figure 2:
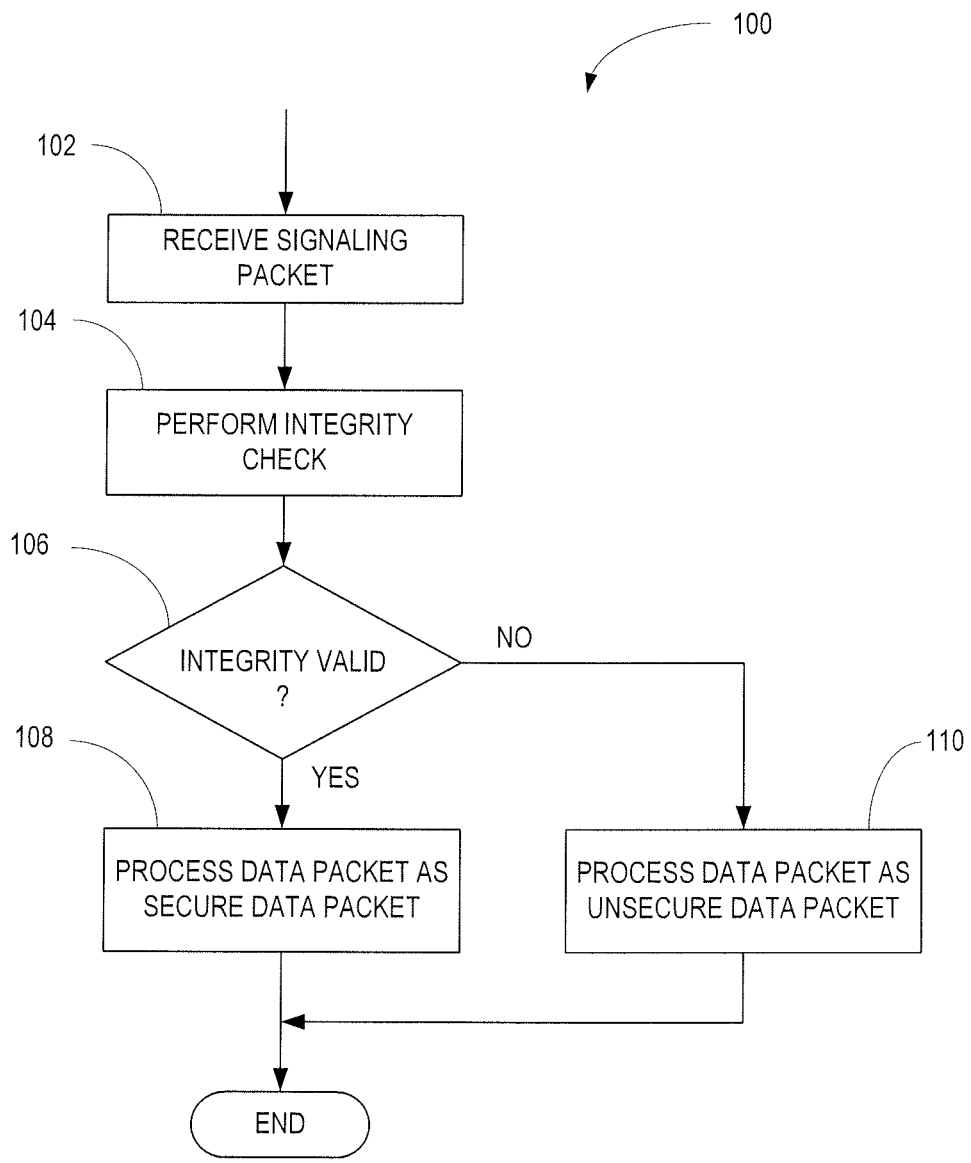
FIG. 2 illustrates an exemplary method implemented for detecting the security mode of a user terminal in the case where ciphering is applied before integrity protection.

FIG. 2 illustrates a method 100 for detecting the start of secure mode in the case where ciphering is applied before integrity protection. Method 100 begins when the base station 22 receives a signaling packet on the uplink following the transmission of the SMC to the user terminal 12 (block 102). In this case, the integrity protection may be used to detect the state of security usage in the user terminal 12 by the base station 22 without decrypting the received signaling packet. Base station 22, which already has all the security parameters including keys and algorithms, checks the integrity of all received uplink packets received at least from the time it sent the SMC on the downlink (block 104). The security processor 24 determines the subsequent handling of the packet based on the outcome of the integrity check (block 106). If the signaling packet passes the integrity check, the base station 22 assumes that security has been activated on the uplink and proceeds to decipher the packet (block 108). If the packet does not pass the integrity check, the base station 22 treats the packet as unciphered and passes it on with an optional indication that the packet was sent without security (block 110). In case security has already been started and the packet does not pass the integrity check, the network 30 may discard the packet or indicate that the packet did not pass the integrity check.

Figure 3:
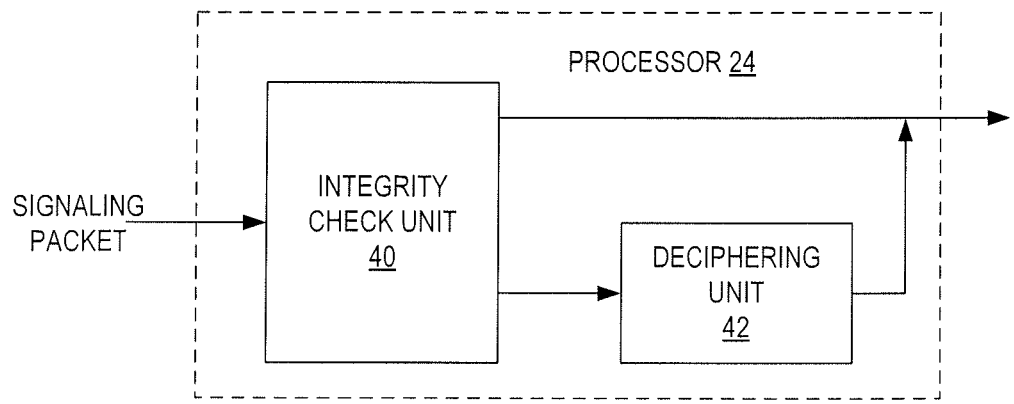
FIG. 3 illustrates an exemplary processor at base station for detecting the security mode of a mobile terminal in the case where ciphering is applied before integrity protection.

FIG. 3 illustrates an exemplary security processor 24 in the base station 22 for detecting the start of security by the user terminal 12 in the situation where ciphering is applied before integrity protection, i.e., where integrity protection is applied to ciphered data packets. Security processor 24 includes an integrity check unit 40 and a deciphering unit 42. The integrity check unit 40 performs an integrity check on all signaling packets received after the SMC is sent to the user terminal 12. The deciphering unit 42 decrypts received signaling packets that pass the integrity check, which means that ciphering is enabled by the user terminal 12. Signaling packets that fail the integrity check are output by the security processor 24 with an indication that the integrity protection is not valid. Note that FIG. 3 illustrates the processing of signaling packets. The processing of traffic packets is not shown. When the security processor 24 detects the start of the secure mode by the user terminal 12 as described above, it enables the deciphering for the data path. Integrity protection is not performed on traffic data packets.

Figure 4:
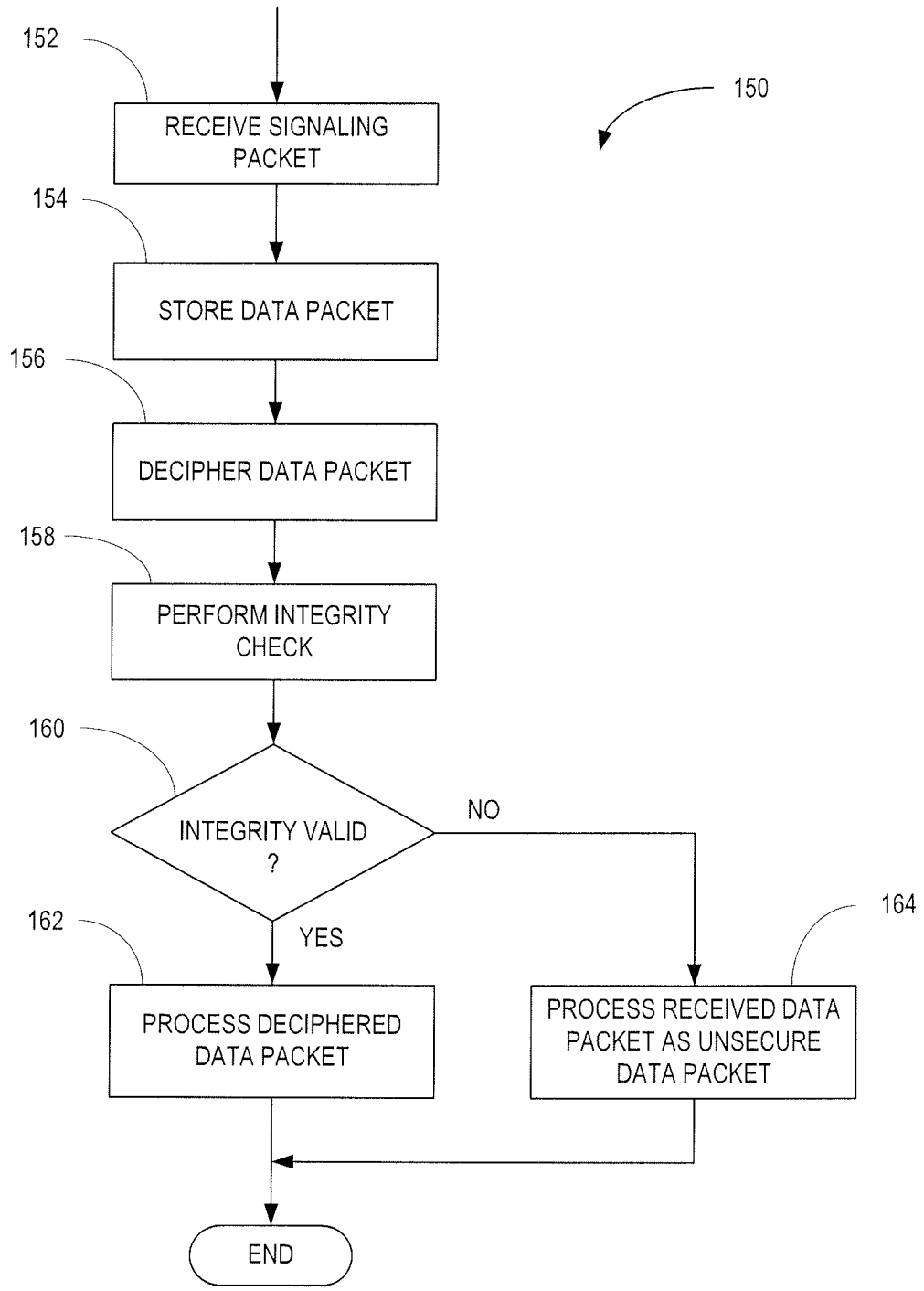
FIG. 4 illustrates an exemplary method implemented for detecting the security mode of a user terminal in the case where integrity protection is applied before ciphering.

FIG. 4 illustrates an alternative method 150 for detecting the start of secure mode by the user terminal 12 in the case where integrity protection is applied before ciphering. The method begins when the base station 22 receives a signaling packet (block 152). In this case, base station 22 assumes that security has been started. The base station 22 temporarily stores the signaling packet (block 154), deciphers the received signaling packet (block 156), and checks the integrity of the deciphered signaling packet (block 158). The security processor 24 determines the subsequent handling of the signaling packet based on the outcome of the integrity check (block 160). If the packet passes the integrity check, security is considered started and the deciphered packet is processed as a secure packet (block 162). If the packet does not pass the integrity check, base station 22 retrieves a copy of the received packet stored before the deciphering operation and forwards the received packet, together with an (optional) indication that the packet was sent without security (block 164). The drawback of this scheme is that it requires extra storage and further incurs unnecessary processing for deciphering in some instances where deciphering is not required.

Figure 5:
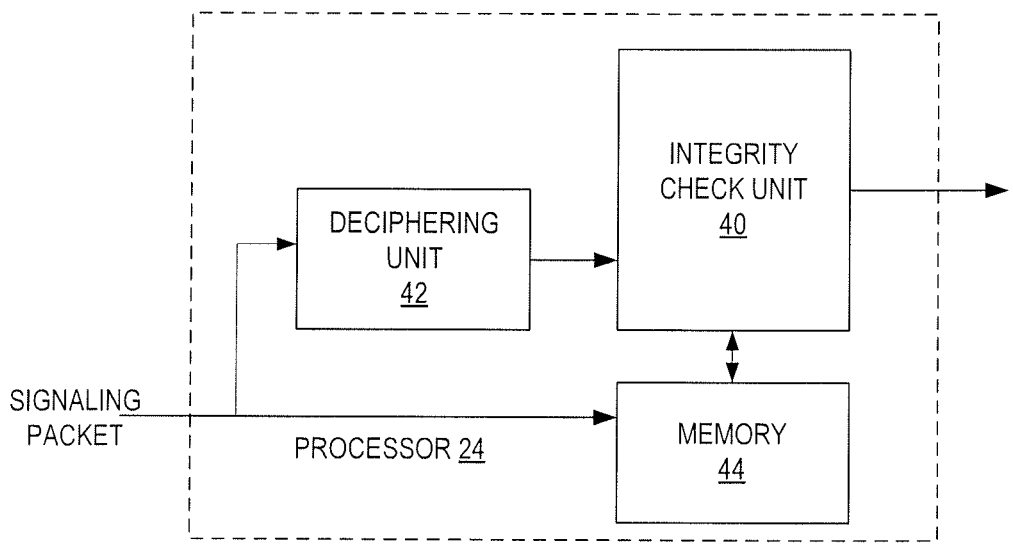
FIG. 5 illustrates an exemplary processor at base station for detecting the security mode of a mobile terminal where integrity protection is applied before ciphering.

FIG. 5 illustrates an exemplary security processor 24 at the base station 22 for detecting the start of secure mode by the user terminal 12 in the situation where integrity protection is applied before ciphering. Security processor 24 includes an integrity check unit 40, a deciphering unit 42, and memory 44. The deciphering unit 42 decrypts the received signaling packet received after the SMC is sent to the user terminal 12 and passes the deciphered signaling packet to the integrity check unit 40. The integrity check unit 40 performs an integrity check on the deciphered signaling packet. Memory 44 stores the received signaling packet while the security processing is performed. If the deciphered signaling packet passes the integrity check, which means that security is enabled by the user terminal 12, the integrity check unit 40 outputs the deciphered signaling packet. If the deciphered signaling packet fails the integrity check, the received signaling packet is output along with an optional indication that the signaling packet is unprotected. Note that FIG. 5 illustrates the processing of signaling packets. The processing of traffic packets is not shown. When the security processor 24 detects the start of secure mode by the user terminal 12 as described above, it enables the deciphering for the data path. Integrity protection is not performed on traffic data packets.

In another embodiment of the invention, the start of security by a user terminal 12 may be detected based on the outcome of header decompression for IP packets transmitted on the uplink. Header compression of an IP packet is normally performed before ciphering for user plane IP data. Integrity protection, if used, is also applied after compression. Header compression is useful to reduce the amount of data sent over the air interface, without any loss of information.

On the receiving side, decompression of the compressed header that is received is performed after deciphering and integrity protection (if used). Header compression algorithms, such as ROHC (e.g., IETF RFC3095, RFC4995, RFC4996) normally use a CRC within the compressed header. The CRC allows the decompressor to verify the outcome of the decompression attempt and, upon failure to verify, to initiate recovery mechanisms (e.g., feedback and request for context update).

Whether decompression is successful or not depends on the use of a suitable and coherent context state (compression and decompression state), and on the absence of errors in the compressed information. Header decompression will fail if the context state used by the decompressor during decompression is not the same as the context state used by the compressor when compressing the header. Header decompression may also fail when the compressed data input to the decompressor is corrupted (e.g., it has at least 1 bit in error).

When a decompression attempt fails, the data packet is normally discarded by the decompressor. Upper layers will thus not receive any useful data. Upon repeated failures, the decompressor will typically assume that there is a problem with the context state it uses to decompress because residual errors are not expected to occur frequently. When the decompressor determines that its context is damaged, it will initiate error recovery, e.g., by sending feedback to the compressor requesting specific actions to repair the possibly damaged context state.

Figure 6:
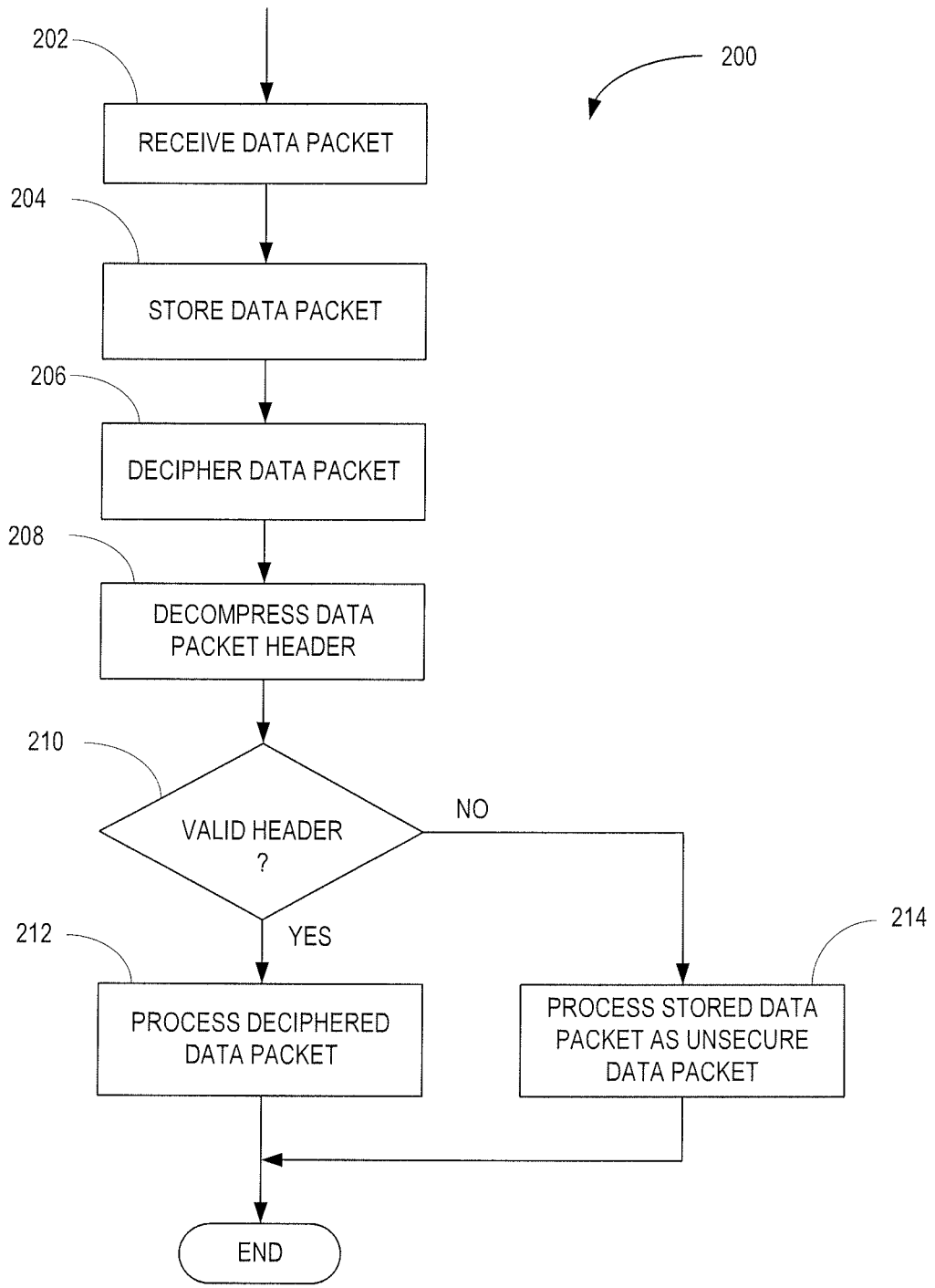
FIG. 6 illustrates an exemplary method implemented for detecting the security mode of a user terminal based on the outcome of header decompression.

FIG. 6 illustrates an exemplary method 200 for determining the start of the secure mode by a user terminal 12 based on the outcome of header decompression for IP packets transmitted on the uplink. This method may be used for both signaling packets and traffic packets, collectively referred to herein as data packets. When header compression is used, detection of security activation by a user terminal 12 may be based on one or more failure(s) to successfully verify decompression using the CRC carried within the compressed data (See IETF RFC3095, 4995, 4996). As noted above, the header compression/decompression algorithms typically use a header CRC to verify the outcome of the decompression. When a compressed IP packet is received (block 202), the received packet is stored in memory (block 204). The received packet is then deciphered based on the assumption that the user terminal 12 is applying security (block 206). Following deciphering, the header is decompressed (block 208) and the outcome of the decompression is checked using the header CRC (block 210). If the decompression is successful, it may be assumed that the user terminal 12 applied security and the deciphered packet is processed as a secure data packet (block 212). If the decompression fails, it may be assumed that the user terminal 12 did not apply security and the received packet is processed as an insecure data packet (block 214). Decompression may later be re-attempted for packets that initially failed decompression before the security activation was detected, by buffering those packets during the detection process. In this embodiment, it makes no difference whether integrity protection is used or not.

Other forms of checksums and other error detection codes may be used analogously to detect activation of ciphering. For example, when a packet includes a checksum that is ciphered as part of the packet, the outcome of checksum verification following deciphering may be used to indicate the start of the secure mode by the user terminal 12. If the checksum is validated following deciphering, then it may be assumed that the user terminal 12 started using security. Conversely, if the checksum fails after deciphering, then it may be assumed that the user terminal 12 has not started using security.

Figure 7:
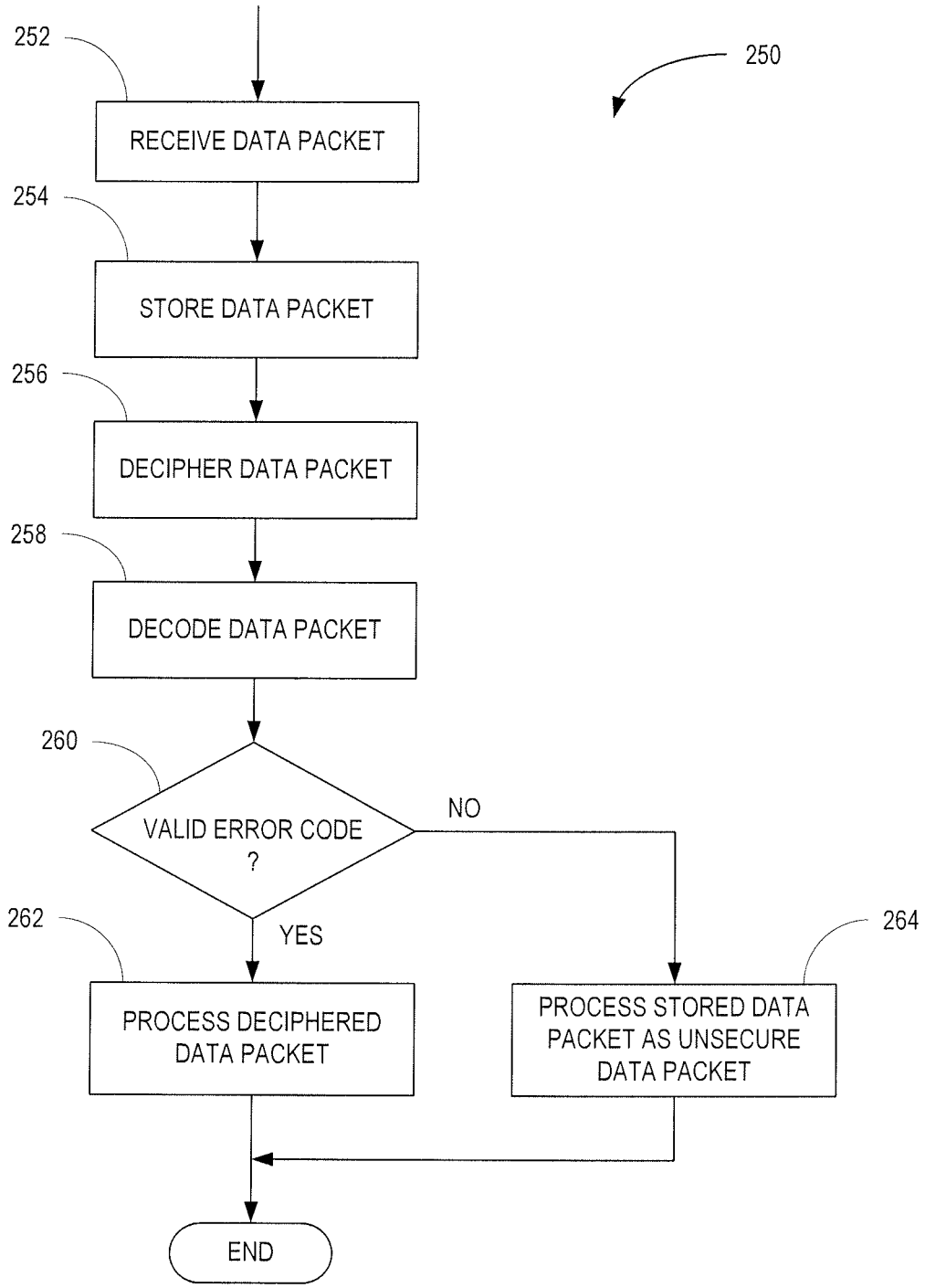
FIG. 7 illustrates an exemplary method implemented for detecting the security mode of a user terminal based on the outcome of error decoding.

FIG. 7 illustrates an exemplary method 250 for determining the start of the secure mode by a user terminal 12 based on the outcome of error detection decoding. When a CRC or other error detection code is used, detection of security activation by a user terminal 12 may be based on one or more failure(s) to decode the data packets. When a coded data packet is received (block 252), the received data packet is stored in memory (block 254). The received data packet is then deciphered based on the assumption that the user terminal 12 is applying security (block 256). Following deciphering, the data packet is decoded (block 258). If the data packet is decoded successfully (block 260), it may be assumed that the user terminal 12 applied security and the deciphered data packet is processed (block 262). If the data packet fails to decode successfully, it may be assumed that the user terminal 12 did not apply security and the received data packet is processed as an insecure data packet (block 264).

Figure 8:
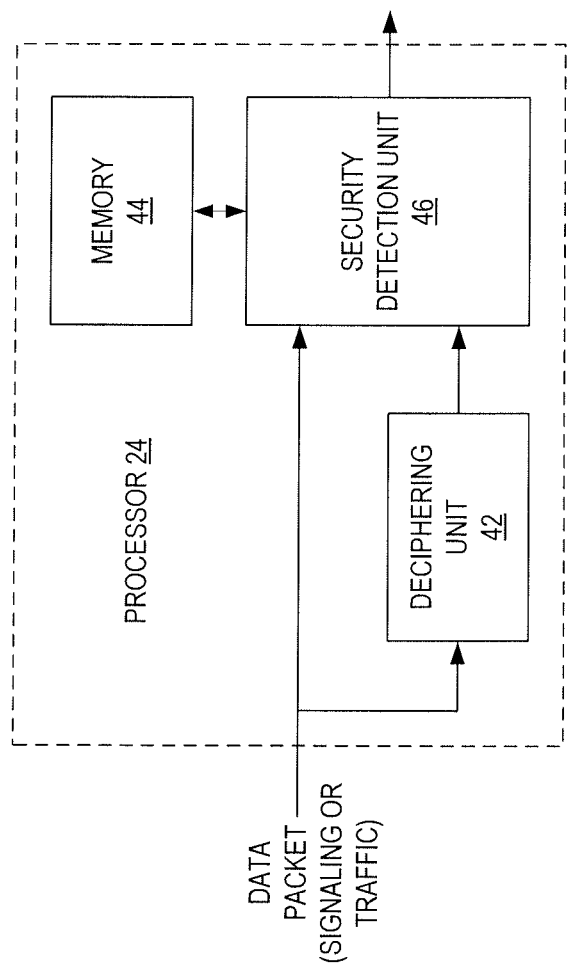
FIG. 8 illustrates an exemplary processor at base station for detecting the security mode of a mobile terminal based on the outcome of header decompression and/or decoding.

FIG. 8 illustrates an exemplary security processor 24 at the base station 22 for detecting the start of the secure mode by the user terminal 12 in the situation where IP header compression is used or in situations where the received data packet includes a checksum or other error detection code that is applied prior to ciphering. Security processor 24 includes a deciphering unit 42, security detection unit 46, and memory 44. The deciphering unit 42 decrypts the data packet received after the SMC is sent to the user terminal 12 and passes the deciphered data packet to the security detection unit 46. The security detection unit 46 detects the state of security of the user terminal 12 based on the outcome of a CRC check or other error detection process. Memory 44 stores the received data packet while the security processing is performed. If the received data packet comprises a compressed IP packet, the security detection unit 46 decompresses the header of the deciphered packet and checks the CRC of the decompressed header. If the received data packet includes a CRC or other error detection code, the security detection unit 46 checks the validity of the CRC. In either case, if the CRC is valid, the security detection unit 46 outputs the deciphered packet. On the other hand, if the CRC is invalid, the security detection unit 46 outputs the received data packet.

In the exemplary embodiments described above, the verification of the integrity protection, header decompression, checksum, or other error detection code may be discontinued once the start of the secure mode by the user terminal 12 is detected. Once security is detected, it may be assumed that all subsequently transmitted packets will be transmitted securely, e.g., with ciphering and/or integrity protection enabled. In other embodiments, the verification of the integrity protection, header decompression, checksum, or other error detection code may continue in order to detect a security failure after secure mode begins.

Once security is activated by the user terminal 12, a failure in security may be detected based on one or more failure(s) to verify the integrity protection of data packets transmitted on the uplink. Once integrity protection is started by the user terminal 12, the base station 22 assumes that all subsequent data packets transmitted on the uplink are protected. If the integrity protection cannot be verified for a number of data packets, it may be assumed that a security failure has occurred.

When header compression for IP packets is used, a security failure may be detected based on one or more failure(s) to successfully verify decompression using the CRC carried within the compressed data (See IETF RFC3095, 4995, 4996). The received data packet is deciphered and then the IP header is decompressed. The decompression is verified using the header CRC. If the decompression fails for one or more data packets, it may be assumed that a security failure has occurred. In this embodiment, it makes no difference whether integrity protection is used or not. This technique may be used by a base station 22 or by a user terminal 12 to detect security failure.

In the case that the data packet includes a checksum or error detection code that is ciphered as part of the data packet, a change in the state of security from active to inactive or security failure may be detected based on one or more failure(s) of the verification of the checksum. Repeated failure of the checksum verification may be taken as an indication of a security failure. This technique may be used by a base station 22 or by a user terminal 12 to detect security failure.

Figure 9:
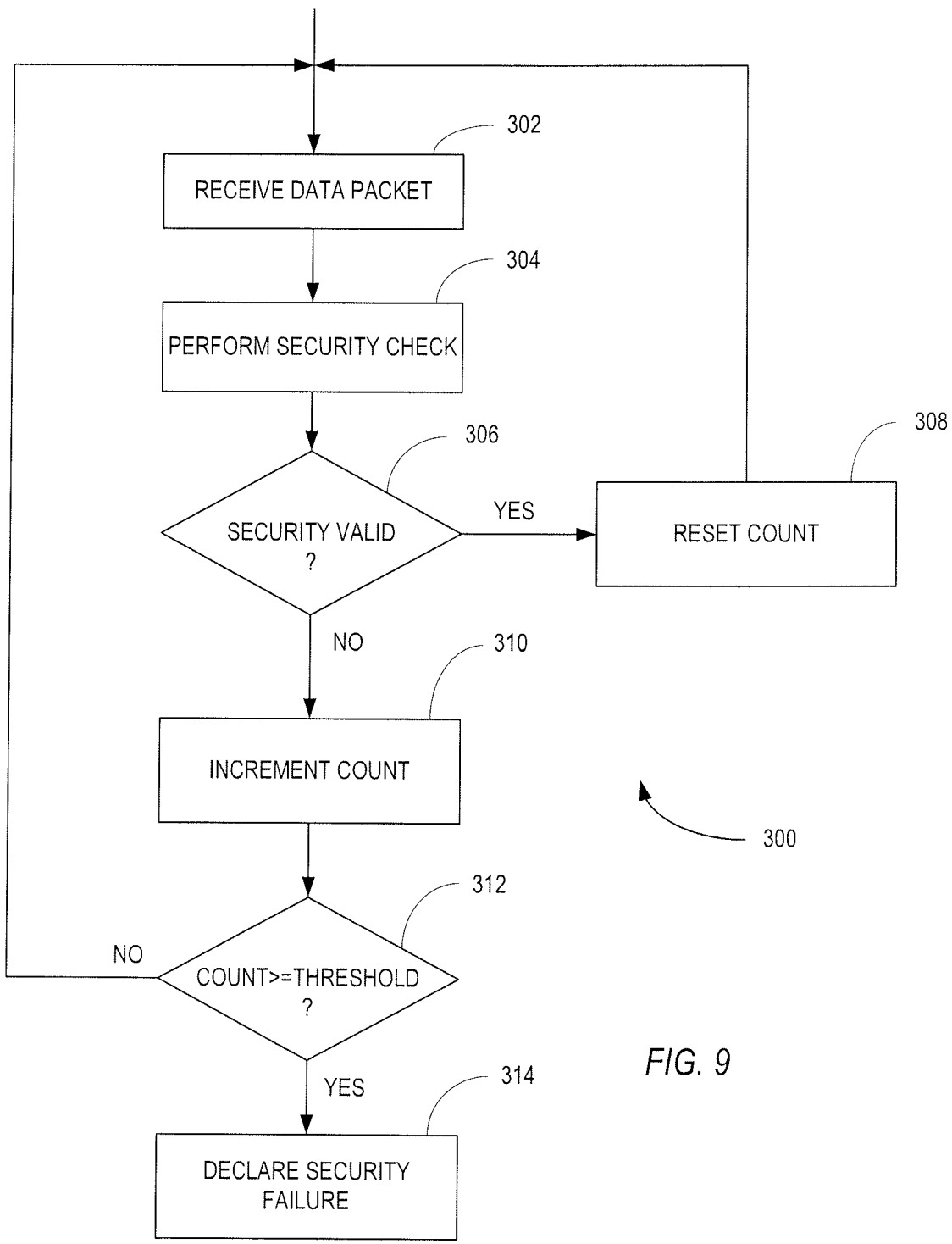
FIG. 9 illustrates an exemplary method implemented for detecting a security failure after security is activated by a user terminal.

FIG. 9 illustrates one exemplary method 300 for detecting a security failure after the secure mode has been enabled by the user terminal 12. This method 300 starts after the base station 22 has detected the start of the secure mode by the user terminal 12. Thus, it is assumed that all data packets have security applied. When a data packet is received (block 302), the base station 22 performs a security check to make sure the applied security is valid (block 304). If the packet fails the security check (block 306), the base station increments a counter (block 310) and compares the count to a predetermined threshold (block 312). If the count equals the threshold, a security failure is declared (block 314). In the case where the security applied to the data packet is valid, the base station 22 resets the count to zero (block 308).

The methods described herein may be implemented by software executed by a processor in a base station 22 and/or user terminal 12. The software comprises instructions stored in a computer readable medium that are executable by the processor. An exemplary computer readable medium may comprise a random access memory (RAM), a read only memory (ROM), FLASH memory, or other know memory devices.

An advantage of the present invention is that it reduces delay because uplink signaling does not need to be suspended during activation of the secure mode. Overhead is reduced because no extra indication of the state of ciphering/integrity protection is needed in the packet header. Other advantages include reduced storage requirements and reduced processing. The present invention also solves the problem of detecting security failures when header compression is used.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of processing received data packets where the security state of the transmitting terminal is not known, said method comprising:
    transmitting a secure mode command to a user terminal;
    receiving a plurality of data packets from the user terminal following the transmission of the secure mode command;
    determining a security mode of the user terminal by determining whether a received data packet has valid security;
    processing the received data packet as a secure packet if the received data packet has valid security;
    processing the received data packet as an insecure packet if the received data packet lack valid security; and
    determining that a security failure has occurred based on lack of valid security for a predetermined number of consecutive data packets.

2. The method of claim 1, wherein determining whether the received data packet has valid security comprises determining whether the received data packet has valid integrity protection.

3. The method of claim 2, further comprising deciphering the received data packet and forwarding the deciphered data packet if the integrity protection is valid.

4. The method of claim 3, further comprising forwarding the deciphered data packet with an indication that the deciphered data was transmitted securely.

5. The method of claim 2, further comprising discarding the received data packet if the data packet lacks valid integrity protection.

6. The method of claim 2, further comprising forwarding the received data packet with an indication that the received data packet is insecure if the received data packet lacks valid integrity protection.

7. The method of claim 1, wherein determining whether the received data packet has valid security comprises:
    deciphering the received data packet; and
    determining whether valid security has been applied to the deciphered data packet.

8. The method of claim 7, further comprising storing a copy of the received data packet in memory before deciphering said received data packet, and processing the received data packet stored in memory if the deciphered data packet lacks valid security.

9. The method of claim 8, wherein determining whether the received data packet has valid security comprises determining whether the deciphered data packet has valid integrity protection.

10. The method of claim 9, further comprising forwarding the deciphered data packet if the deciphered data packet has valid integrity protection.

11. The method of claim 8, wherein determining whether the received data packet has valid security comprises decompressing a presumed header of the deciphered data packet, and determining whether the decompressed data packet is valid.

12. The method of claim 11, further comprising forwarding the decompressed data packet if the decompressed data packet is valid.

13. The method of claim 8, wherein determining whether the received data packet has valid security comprises decoding the deciphered data packet to determine whether the deciphered data packet has a valid error protection code.

14. The method of claim 13, further comprising forwarding the decoded data packet if the deciphered data packet has a valid error protection code.

15. A base station comprising:
    a transceiver for sending data to and receiving data from a user terminal;
    a processor operatively connected to said transceiver and configured to:
    receive a plurality of data packets from the user terminal following transmission of a secure mode command;
    determine a security mode of the user terminal by determining whether a received data packet has valid security; and
    determine the occurrence of a security failure based on lack of valid security for a predetermined number of consecutive received data packets.

16. The base station of claim 15, wherein the processor determines whether a received data packet has valid security by determining whether the received data packet has valid integrity protection.

17. The base station of claim 16, wherein the processor is further configured to decipher the received data packet and to forward the deciphered data packet if the integrity protection is valid.

18. The base station of claim 17, wherein the processor is further configured to forward the deciphered data with an indication that the deciphered data was transmitted securely.

19. The base station of claim 16, wherein the processor is further configured to discard a received data packet lacking valid integrity protection.

20. The base station of claim 16, wherein the processor is further configured to forward the received data packet with an indication that the received data packet was transmitted insecurely if the received data packet lacks valid security.

21. The base station of claim 15, wherein the processor determines whether the received data packet has valid security by deciphering the received data packet, and determining whether valid security has been applied to the deciphered data packet.

22. The base station of claim 21, wherein the processor is further configured to store a copy of the received data packet in memory before deciphering the received data packet, and to forward the received data packet stored in memory if the deciphered data packet lacks valid security.

23. The base station of claim 22, wherein the processor determines whether the received data packet has valid security by determining whether the deciphered data packet has valid integrity protection.

24. The base station of claim 23, wherein the processor is further configured to forward the deciphered data packet if the deciphered data packet has valid integrity protection.

25. The base station of claim 22, wherein the processor determines whether the received data packet has valid security by decompressing a presumed header of the deciphered data packet, and determining whether the decompressed data packet is valid.

26. The base station of claim 25, wherein the processor is further configured to forward the decompressed data packet if the decompressed data packet is valid.

27. The base station of claim 22, wherein the processor determines whether the received data packet has valid security by decoding the deciphered data packet to determine whether the deciphered data packet has a valid error protection code.

28. The base station of claim 27, wherein said processor is further configured to forward the decoded data packet if the deciphered data packet has a valid error protection code.

* * * * *